(12) United States Patent
Chevallier

(10) Patent No.: US 8,089,542 B2
(45) Date of Patent: Jan. 3, 2012

(54) CMOS IMAGER WITH INTEGRATED CIRCUITRY

(75) Inventor: Christophe J. Chevallier, Palo Alto, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 13/118,066

(22) Filed: May 27, 2011

(65) Prior Publication Data

US 2011/0228153 A1    Sep. 22, 2011

Related U.S. Application Data

(60) Continuation of application No. 12/533,146, filed on Jul. 31, 2009, now Pat. No. 7,952,631, which is a division of application No. 11/034,165, filed on Jan. 12, 2005, now Pat. No. 7,569,414, which is a continuation of application No. 09/136,680, filed on Aug. 19, 1998, now Pat. No. 6,879,340.

(51) Int. Cl.
H04N 5/225 (2006.01)
H04N 5/76 (2006.01)
H04N 3/14 (2006.01)

(52) U.S. Cl. ............. 348/294; 348/231.9; 348/308; 250/208.1

(58) Field of Classification Search .......... 348/207.99, 348/231.7, 231.9, 294, 298, 308; 250/208.1; 235/462.41
See application file for complete search history.

(56) References Cited

U.S. PATENT DOCUMENTS

| | | |
|---|---|---|
| 5,241,412 A | 8/1993 | Ross |
| 5,883,830 A | 3/1999 | Hirt et al. |
| 5,909,026 A | 6/1999 | Zhou et al. |
| 5,986,284 A | 11/1999 | Kusaba et al. |
| 6,057,539 A | 5/2000 | Zhou et al. |
| 6,140,630 A | 10/2000 | Rhodes |
| 6,172,351 B1 | 1/2001 | Kimura |
| 6,204,524 B1 | 3/2001 | Rhodes |
| 6,232,626 B1 | 5/2001 | Rhodes |
| 6,248,991 B1 | 6/2001 | Chen et al. |
| 6,255,690 B1 | 7/2001 | Komori et al. |
| 6,278,481 B1 | 8/2001 | Schmidt |
| 6,291,280 B1 | 9/2001 | Rhodes |
| 6,310,366 B1 | 10/2001 | Rhodes et al. |
| 6,333,205 B1 | 12/2001 | Rhodes |
| 6,369,853 B1 | 4/2002 | Merrill et al. |
| 6,376,868 B1 | 4/2002 | Rhodes |
| 6,407,440 B1 | 6/2002 | Rhodes |
| 6,465,786 B1 | 10/2002 | Rhodes |
| 6,495,434 B1 | 12/2002 | Rhodes |
| 6,611,013 B2 | 8/2003 | Rhodes |
| 6,674,470 B1 | 1/2004 | Tanaka et al. |
| 6,788,340 B1 | 9/2004 | Chen |

(Continued)

OTHER PUBLICATIONS

Aslam-Siddiqi, A, "A 128 Pixel CMOS Image Sensor with Integrated Memory Analog Nonvolatile Memory", IEEE Journal of Solid-State Circuits, 33, (Oct. 1998), 1497-1501.

(Continued)

*Primary Examiner* — Mary Wilczewski
(74) *Attorney, Agent, or Firm* — Schwegman, Lundberg & Woessner, P.A.

(57) ABSTRACT

A CMOS imager is integrated on a single substrate along with logic and support circuitry for decoding and processing optical information received by the CMOS imager. Integrating a CMOS imager and peripheral circuitry allows for a single chip image sensing device.

11 Claims, 3 Drawing Sheets

U.S. PATENT DOCUMENTS

| | | | |
|---|---|---|---|
| 6,852,591 B2 | 2/2005 | Rhodes | |
| 6,879,340 B1 | 4/2005 | Chevallier | |
| 7,037,771 B2 | 5/2006 | Rhodes | |
| 7,154,076 B2 | 12/2006 | Kim et al. | |
| 7,202,098 B2 | 4/2007 | Cole | |
| 7,312,431 B2 | 12/2007 | Rhodes | |
| 7,335,963 B2 | 2/2008 | Ford | |
| 7,385,167 B2 | 6/2008 | Li et al. | |
| 7,390,690 B2 | 6/2008 | Rhodes | |
| 7,557,843 B2 * | 7/2009 | Shizukuishi | 348/294 |
| 7,568,628 B2 * | 8/2009 | Wang et al. | 235/462.45 |
| 7,569,414 B2 | 8/2009 | Chevallier | |
| 7,611,060 B2 * | 11/2009 | Wang et al. | 235/462.23 |
| 7,909,257 B2 * | 3/2011 | Wang et al. | 235/462.45 |
| 7,952,631 B2 | 5/2011 | Chevallier | |
| 2004/0021788 A1 * | 2/2004 | Shizukuishi | 348/311 |
| 2004/0051123 A1 | 3/2004 | Rhodes | |
| 2004/0104412 A1 | 6/2004 | Rhodes | |
| 2005/0057655 A1 | 3/2005 | Duesman | |
| 2005/0082582 A1 | 4/2005 | Rhodes | |
| 2005/0106773 A1 | 5/2005 | Rhodes | |
| 2005/0112792 A1 | 5/2005 | Chevallier | |
| 2006/0022233 A1 | 2/2006 | Rhodes | |
| 2006/0164533 A1 * | 7/2006 | Hsieh et al. | 348/317 |
| 2006/0202036 A1 * | 9/2006 | Wang et al. | 235/462.07 |
| 2007/0034983 A1 | 2/2007 | Rhodes | |
| 2007/0120162 A1 | 5/2007 | Yang et al. | |
| 2007/0210360 A1 | 9/2007 | Rhodes | |
| 2008/0117319 A1 | 5/2008 | Jiang et al. | |
| 2009/0284623 A1 | 11/2009 | Chevallier | |
| 2011/0069960 A1 * | 3/2011 | Knapp et al. | 398/103 |

OTHER PUBLICATIONS

Harbert, Tam, "See CMOS Run", Business Trends, (Aug. 1997), 22.
Kempainen, Stephen, "CMOS Image Sensors: Eclipsing CCD's in Visual Information", EDN Design Feature, (Oct. 9, 1997), 101-119.
Morrison, Gale B., "Motorola Senses CMOS Imager", Electronic News, 43, (Sep. 15, 1997), 1 and 84.

* cited by examiner

CMOS IMAGER WITH INTEGRATED CIRCUITRY

CROSS-REFERENCE TO RELATED APPLICATIONS

The present application is a continuation of U.S. Ser. No. 12/533,146, filed Jul. 31, 2009 now U.S. Pat. No. 7,952,631, which is a divisional of U.S. Ser. No. 11/034,165, filed Jan. 12, 2005, now issued as U.S. Pat. No. 7,569,414, which is a continuation of U.S. Ser. No. 09/136,680, filed on Aug. 19, 1998, now issued as U.S. Pat. No. 6,879,340, which are incorporated herein by reference in their entirety.

TECHNICAL FIELD

The present invention relates generally to image sensing devices and in particular to a complementary metal oxide semiconductor (CMOS) imager.

BACKGROUND

With the advent of multimedia communications, there arises the need for low-cost solid state imagers to complement communication devices and computers. An image input sensor is central to any teleconferencing and multimedia application and is used to convert an optical image focused on the sensor into electrical signals. The image input sensor typically includes an array of light detecting elements where each element produces a signal corresponding to the intensity of light impinging on that element when an image is focused on the array. These signals may then be used, for example, to display a corresponding image on a monitor or to help record information about the optical image, as performed by a digital camera.

A common type of image sensor is a charge coupled device (CCD). CCDs have dominated vision applications because of their superior dynamic range, low fixed-pattern noise and high sensitivity to light. However, CCD technology is quite complex, suffers from low yields, and is expensive due to specialized processing involved to produce such devices. Moreover, integrating analog/digital convertors and digital processing with a CCD array on the same chip is not feasible. As a result, multiple chip sets are required to accommodate the CCD array image sensor and the required logic and processing circuitry. An imaging sensing device having a multiple chip set package is more costly to produce than a device utilizing a single chip set. Other well known disadvantages exist for CCDs.

In comparison, image sensor research has advanced pure complementary metal oxide semiconductor (CMOS) image sensors. CMOS image sensors consist of photodiodes or phototransistors that are used as the light detecting elements where the conductivity of the elements correspond to the intensity of light impinging on the elements. CMOS image sensors have a great cost advantage over CCDs of similar resolution. This is due to the fact that CMOS image sensors have high yields because they are fabricated by the same semiconductor foundries that make computer memory chips, digital signal processors, analog/digital convertors, etc.

CMOS image sensors address many of the shortcomings of CCDs. CMOS technology allows the fabrication of a single chip set having image capture capability along with logic and processing capabilities including analog/digital conversion and digital signal processors. Memory such as RAM and ROM can also be integrated onto the same single chip set. However, integrating non-volatile memory onto the same circuit as a CMOS imager presents a problem due to the non-volatile memory's sensitivity to light. Most non-volatile memory cells rely on a trapped charge stored on a floating gate in a field effect transistor (FET). Erasure of the trapped charge from the floating gate is performed by exposure to ultraviolet light.

As a consequence, current image devices, such as digital cameras, do not place non-volatile memory on the same integrated circuit as the CMOS image sensor. Separating the CMOS imager from non-volatile memory results in an image sensing device having a multiple chip set package which adds to the cost of the device. In addition, the size of the image sensing device is directly related to the required number of chip sets. If non-volatile memory were integrated onto the same integrated circuit as a CMOS imager, then a more compact image sensing device could be achieved.

Therefore, what is needed is a single integrated circuit having a CMOS imager and peripheral components for receiving and processing a received image, including non-volatile memory integrated onto the same integrated circuit. For the reasons stated above, and for other reasons stated below which will become apparent to those skilled in the art upon reading and understanding the present specification, there is a need in the art to provide a CMOS imager with integrated non-volatile memory wherein light received by the image sensor does not effect the non-volatile memory.

DETAILED DESCRIPTION

Figure 1:
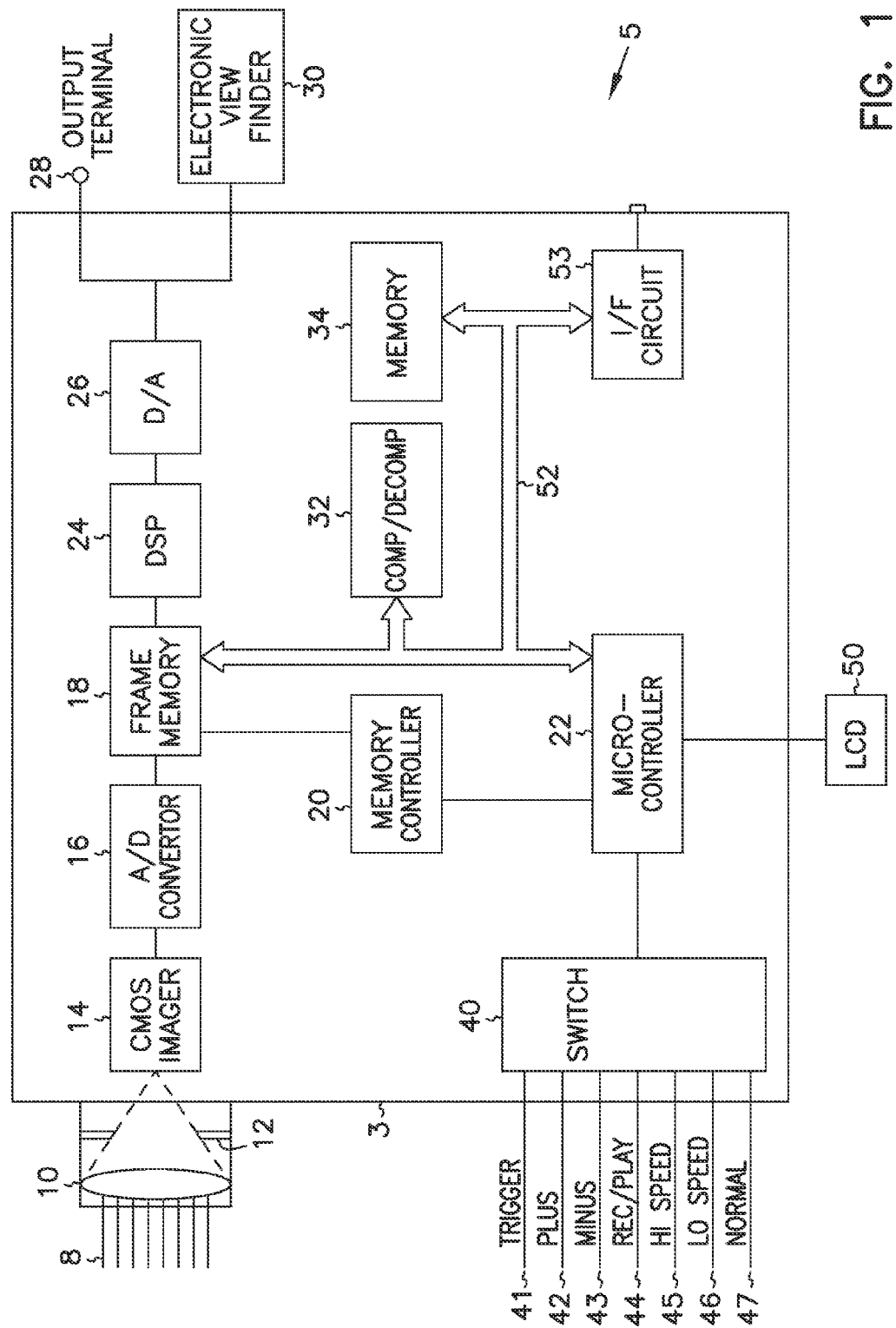
FIG. 1 is a block diagram of an embodiment of a digital camera system utilizing a CMOS imager with integrated non-volatile memory according to the teachings of the present invention.

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense, and the scope of the present inventions is defined only by the appended claims.

The terms wafer and substrate used in the following description include any structure having an exposed surface with which to form the integrated circuit (IC) structure of the invention. The term substrate is understood to include semiconductor wafers. The term substrate is also used to refer to semiconductor structures during processing, and may include other layers that have been fabricated thereupon. Both wafer and substrate include doped and undoped semiconductors, epitaxial semiconductor layers supported by a base semiconductor or insulator, as well as other semiconductor structures well known to one skilled in the art. The term conductor is understood to include semiconductors, and the term insulator is defined to include any material that is less electrically conductive than the materials referred to as conductors.

A CMOS imager and non-volatile memory are integrated on a single integrated circuit wherein a layer of protective material covers the non-volatile memory for blocking light received by the imager. Logic and support circuitry are also fabricated on the integrated circuit for decoding and processing optical information received by the CMOS imager.

In one embodiment, an image sensor is disposed on an integrated circuit, wherein the integrated circuit comprises a CMOS imager for defining an image, non-volatile memory for storing the image and/or program code information, and logic and support circuitry are fabricated on the integrated circuit such that a level of protective material covers the non-volatile memory for blocking light received by the CMOS imager. The level of protective material is a metal or opaque material provided as part of the fabrication process. A method of fabricating a CMOS imager on an integrated circuit with non-volatile memory is also presented herein.

CMOS technology allows the fabrication of a single chip set having image capture, analog/digital conversion, digital processing and image storing capabilities. Image storing capabilities eliminates the need for placing non-volatile memory on a separate chip to protect it from the light received by the CMOS imager. Further, a single chip set allows a lower cost imaging device. In addition, an imaging device comprising a single chip set is more compact in size as compared to a multiple chip set imaging device.

Integrating non-volatile memory onto the same substrate as a CMOS imager which captures optical information, including logic and support circuitry for decoding and processing this information, allows a single chip set to replace a multiple chip set imaging device performing the same function. In different embodiments of the invention, a protective layer of varying scope provides for blocking light received by the CMOS imager, wherein the protective layer is a metal or opaque material provided as part of the fabrication process.

The present invention, in one embodiment, is a single integrated circuit having a complementary metal oxide semiconductor (CMOS) imager for capturing optical information, logic circuitry to decode and process the information and non-volatile memory for storing the optical information and/or program code, wherein the non-volatile memory is covered by a protective layer for blocking light received by the CMOS imager. The protective layer can be a metal or opaque material provided as part of the fabrication process of the integrated circuit. The present invention thus allows non-volatile memory to be placed on the same integrated circuit as the CMOS imager without having the light received by the CMOS imager adversely effecting stored data. A digital camera system utilizing the CMOS imager is first described, wherein the digital camera system serves as an alternate embodiment of the present invention. An architecture of the CMOS imager is also presented along with a general layout, or floorplan, of a single substrate having the CMOS imager, non-volatile memory and processing capabilities integrated thereon.

FIG. 1 is a block diagram of an embodiment of a single chip 3 digital camera system 5 utilizing a CMOS imager 14 with integrated non-volatile memory 34 according to the teachings of the present invention. There are several different techniques used to make digital cameras 5, wherein the techniques provide for different quality cameras covering a variety of applications. These techniques are well known in the art and the invention is not limited to any particular digital camera type.

Referring to FIG. 1, light 8 representing an image passes through a lens 10 that is controlled by a stop 12 and shutter (not shown). The light 8 is photoelectrically converted by the CMOS imager 14, which is an image pick-up device for generating and outputting an analog image signal photoelectrically converted from an image incident thereon. CMOS imagers 14 are well known to one skilled in the art and the present invention is not limited to any particular type of CMOS imager.

The analog image signal from the CMOS imager 14 is converted by an analog/digital (A/D) convertor 16 to be recorded in a frame memory 18. The writing and reading of image data in and out of the frame memory 18 are controlled by a memory controller 20 under the control of a microcontroller 22. The digital image data read out from the frame memory 18 is coupled to a digital signal processor (DSP) 24. An output from the DSP 24 is converted into an analog image signal by a digital/analog (D/A) convertor 26. The analog image signal is supplied to an output terminal 28 and an electronic view finder 30 for viewing.

Video data that is read out of the frame memory 18 is subjected to a compression process in a data compression/decompression unit 32 conforming to a compression standard, such as Joint Pictures Expert Group (JPEG). Other compression standards well known to one skilled in the art are acceptable, such as wavelet compression. Unlike Fourier and cosine transforms for compression, Wavelet compression consists of transforming signals into a sum of small, overlapping waves for analyzing, storing and transmitting information.

The compressed image data is fed to a memory unit 34 to be recorded. Memory unit 34 comprises non-volatile memory so that if power is removed from the camera 5 the data contents remain in the memory cells that make up the non-volatile memory unit 34. Non-volatile memory includes, but is not limited to, EPROM, EEPROM and flash memory.

In lieu of utilizing non-volatile memory for storing images, the non-volatile memory in, one embodiment, could be used to store program code information while the images can be stored in a in a battery backed up RAM (not shown). In one embodiment, the code is firmware for controlling a digital signal processor 24 or the micro-controller 22. Also included within the firmware are control of other parameters that effect the digital camera 5, such as specific sensitivities of the imager field, a camera identification number, or additional parameters.

Most non-volatile memory cells rely on a trapped charge stored on a floating gate in an FET. The charge reaches the floating gate either by tunneling or avalanche injection from a region near the drain. Erasure of the charge from a floating gate is made by tunneling or by exposure to ultraviolet light. Unless the memory unit 34 is protected from the light 8 received by the CMOS imager, data stored on a floating gate within the memory unit 34 can be erased. Protection of the non-volatile memory unit 34 from light received by the CMOS imager 14 is described in more detail with reference to FIG. 3. In another embodiment, the non-volatile memory cells store a charge at an interface of two layers of oxide. For purposes of the invention, a memory cell which stored data between oxide layers is considered equivalent to a floating gate.

In playback, the video image that is read out from the memory unit 34 is recorded in the frame memory 18. The video data that is read out from the frame memory 18 is, like in the previous case, fed through the DSP 24 and another D/A convertor 26 for viewing via the electronic view finder 30 or via a monitor coupled to the output terminal 28.

The frame memory 18 is controlled by a memory controller 20 which is operated according to the micro-controller 22. The micro-controller 22 also controls the data compressing/decompressing unit 32, memory controller 20, and the memory unit 34.

A switch 40 is coupled to the micro-controller 22 for providing information regarding the operation of the digital camera 5. The switch 40 comprises a plurality of individual switches. For instance, a trigger 41 switch is provided for instructing exposure operation, a plus 42 and a minus 43 switch for selecting an image in a play-back operation, a record/play 44 switch for instructing recording and play-back operation. Other switches allow for control of the mode of the camera such a high-speed mode 45, a low-speed mode 46 and a normal speed mode 47. The digital camera 5 is not limited to the above described switches and one skilled in the art realizes other switching options applicable to the digital camera 5 depicted in FIG. 1. An LCD 50 displays the camera operation state under control of the micro-controller 22.

The micro-controller 22 receives and outputs data through data bus 52 to control the entire digital camera 5 operation. The recording of the extracted image in the memory unit 34 is made through the control of the micro-controller 22. An image received by the CMOS imager 14 is produced by extracting the digital image data from the frame memory 18 and storing this image in the memory unit 34. Interface circuitry 53 is also coupled to the data bus for communicating the image data to another device, such as a printer, a computer, or even a memory card. In one embodiment, interface circuitry 53 is a PCMIA interface.

Figure 2:
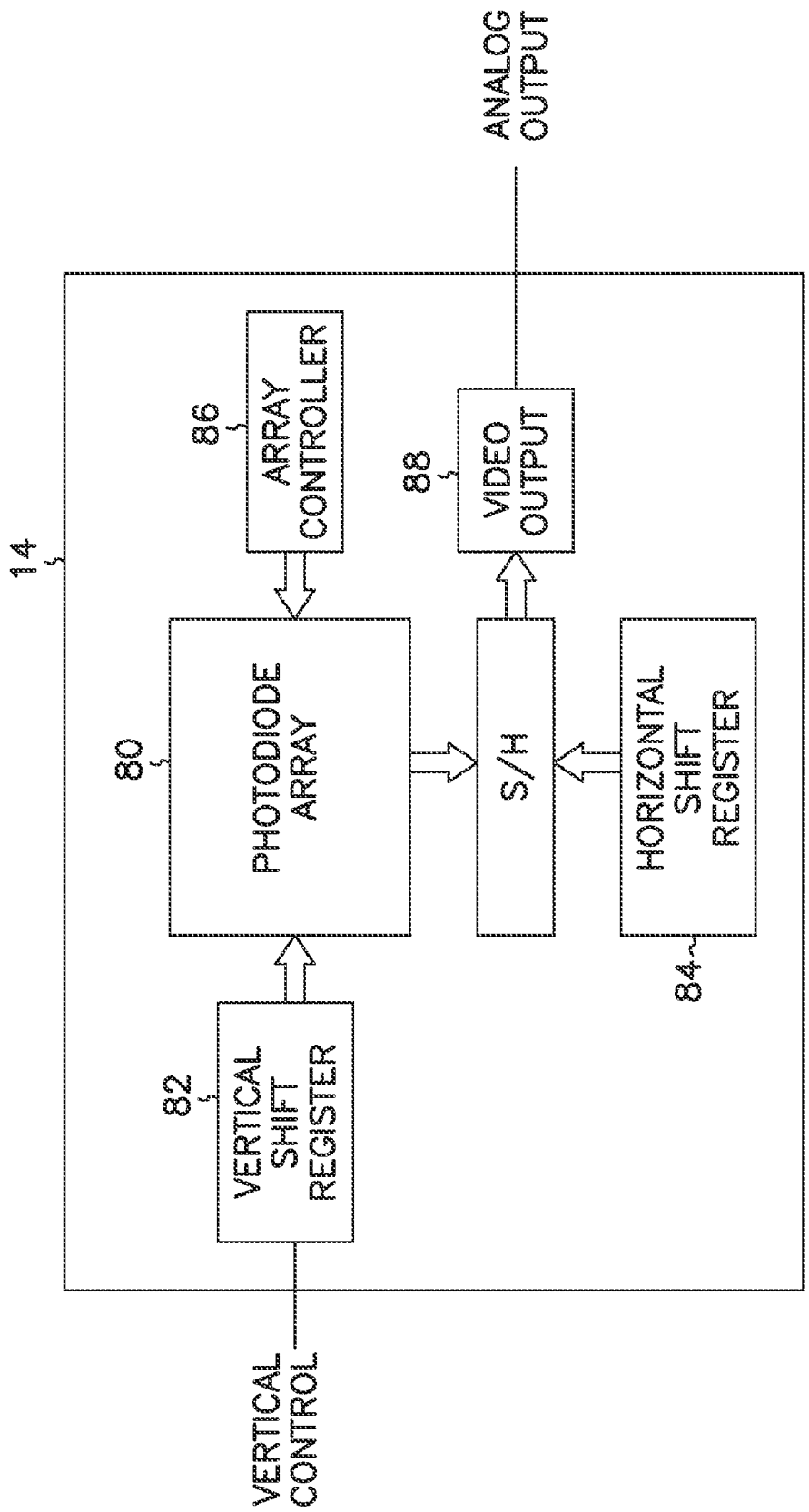
FIG. 2 is an embodiment of a typical architecture for a CMOS imager.

An embodiment of a CMOS image sensor 14, of the present invention, is illustrated in FIG. 2. The CMOS imager 14 is a solid state imaging device that depends on a photovoltaic response when silicon is exposed to light 8. Photons in the visible and near-IR regions of the spectrum have sufficient energy to break covalent bonds in the silicon. The number of electrons released is proportional to the intensity of the light 8 received from an image. The CMOS image sensor 14 can comprise a photodiode array 80, a vertical shift register 82, a horizontal shift register 84, an array controller 86, a video output unit 88 and other support circuits.

One embodiment of the photodiode array 80 comprises 800 horizontal pixels by 1000 vertical pixels. The image format is generally less because the non-image lines provide color characterization and reference information. Support circuits for the photodiode array 80 constitute the rest of the CMOS imager 14. A vertical shift register 82 controls reset, integrate and readout cycle for each line of the array 80. A horizontal shift register 84 controls column readout. A two-way serial interface and internal register (not shown) provide control, monitoring and several operating modes for the camera functions.

CMOS pixel-array 80 construction uses active or passive pixels. Active pixel sensors can be photodiode or photogate pixels and include amplification circuitry in each pixel. Passive pixels use a photodiode to collect the photocharge.

A passive pixel comprises a photodiode in which the photon energy converts to free electrons and comprises an access transistor to a column bus. After photocharge integration, an array controller 86 turns on the access transistor. The charge transfers to the capacitance of the column bus, where the charge integrating amplifier at the end of the bus senses the resulting voltage. The column bus voltage resets the photodiode and the array controller 86 turns off the access transistor. The pixel is then ready for another integration period.

The passive photodiode pixel achieves high "quantum efficiency." Quantum efficiency is a ratio of photon-generated electrons that the pixel captures to the photons incident on the pixel area. A low fill factor reduces quantum efficiency wherein the fill factor is a ratio of light-sensitive area to the pixel's total size, also known as aperture efficiency.

An active photogate pixel utilizes a charge-transfer technique to enhance the array's 80 image quality. The active circuitry then performs a doubling-sampling readout. First, the array controller 86 resets the output diffusion, and a source-follower buffer reads the voltage. Then a pulse on the photogate and access transistor transfers the charge voltage. This correlated double-sampling technique enables fast readout and mitigates fixed pattern noise and reset noise at the source.

Independent of utilizing active or passive pixels, the output of the array 80 is an analog image signal photoelectrically converted from an image incident thereon which then passes through a video output unit 88 before reaching the A/D convertor 16 illustrated in FIG. 1.

Figure 3:
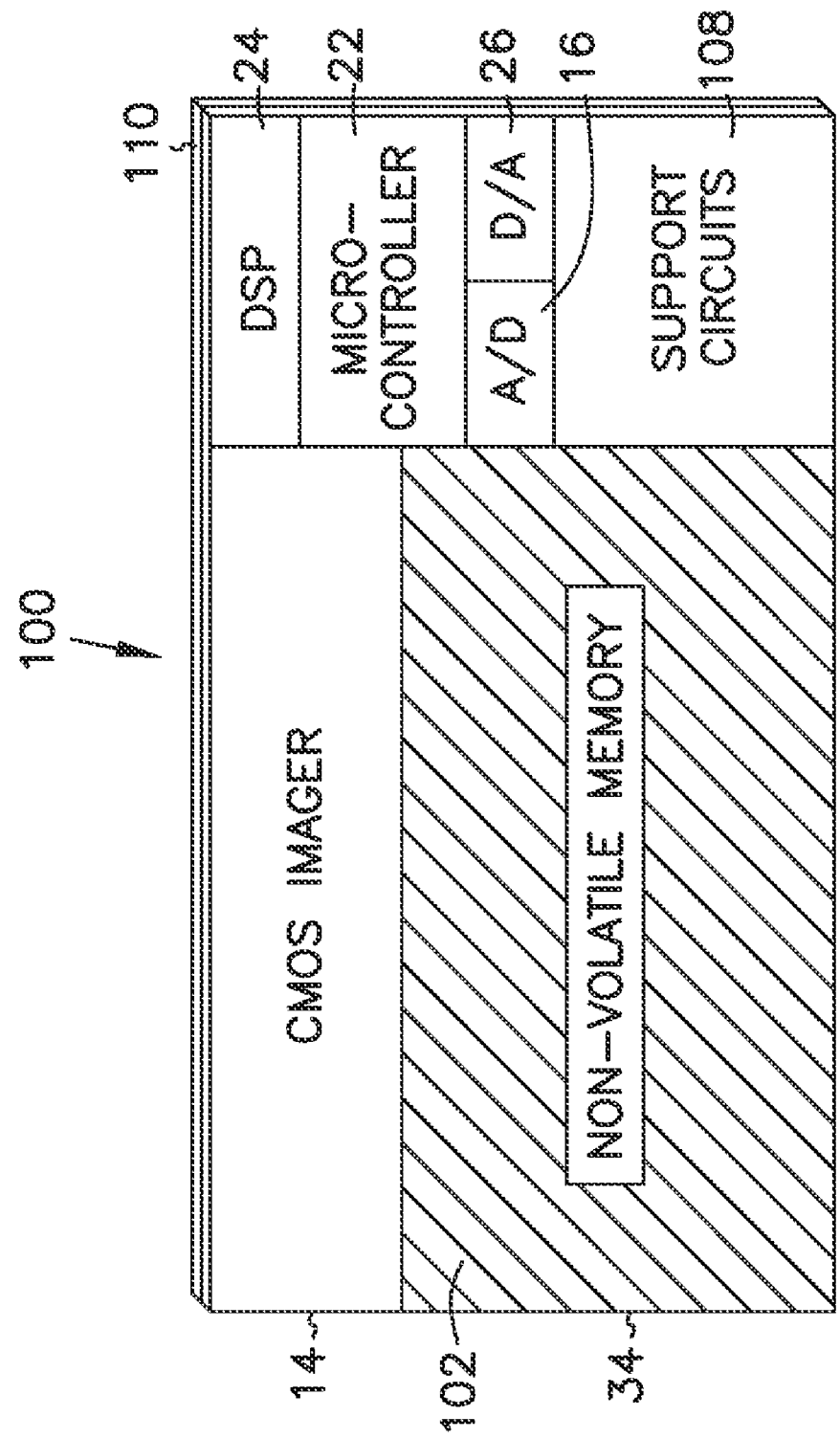
FIG. 3 is a plan views of an integrated circuit having a CMOS imager along with non-volatile memory covered by a protective layer according to the teachings of the present invention.

FIG. 3 is plan view of an integrated circuit 100 having a CMOS imager 14 and non-volatile memory 34 which is covered by a protective layer. In FIG. 3, a protective layer 102 covers the non-volatile memory 34 so that light received by the CMOS imager 14 does not effect data stored within the memory cells. Other circuits fabricated onto the single integrated circuit 3 can include the micro-controller 22, an A/D convertor 16, a D/A convertor 26 and a DSP 24. Logic support circuitry 108 is also fabricated onto the circuit 100, wherein the logic circuitry 108 comprises the remainder of the functions necessary for the digital camera 5 to operate. Logic circuitry 108 components are collectively referred to as peripheral support for the CMOS imager 14 and the non-volatile memory unit 34.

In one embodiment the protective layer 102 (in addition to covering the non-volatile memory 34) is a metal layer used as an interconnect for electrically connecting other areas of the integrated circuit 100. That is, one of the metal layers used to connect circuitry of the integrated circuit is not patterned over the memory cells and provides an opaque protective layer. In another embodiment the protective layer is an opaque material utilized by the imager 14 for blocking light in between the pixels. Thus, the opaque material provided for the imager is, likewise, used to provide a memory protection layer. This opaque material can be, but is not limited to, metal. For example, the opaque material can be polyamide. Because the non-volatile memory 34 is susceptible to light, the protective layer 102 serves to block exposure to light received by the imager 14. Even though the protective layer 102 primarily serves to block light from reaching the non-volatile memory 34, the protective layer 102 can be utilized to cover the other components integrated on the substrate 110 to minimize the build up of heat resulting from the received light.

Fabrication processes for the CMOS integrated circuit 100 closely resemble those of fabricating microprocessors and ASICs because of the similar diffusion and transistor structures. Several metal layers are optimal for producing image sensor 14. One of these metal layers can be utilized as the protective layer 102.

A difference between CMOS image sensor processes and advanced microprocessor and ASIC processes is that the decreasing feature size works well for logic circuits but does not benefit pixel construction. Smaller pixels mean lower light sensitivity and dynamic range. Even though the logic circuits can be made smaller, the photosensitivity area can shrink only so far before diminishing the benefits of less silicon area.

Each single integrated circuit 100 is fabricated upon a monolithic substrate 110. In one embodiment, the substrate 110 is a bulk semiconductor, such as P-silicon. In another embodiment, an epitaxial substrate 110 is used.

CONCLUSION

A CMOS imager 14 and non-volatile memory 34 integrated onto a single substrate 110 along with logic and support circuitry for decoding and processing optical information received by the CMOS imager 14 has been described. A protective layer 102 covers the non-volatile memory 34 contained on the substrate 110 for blocking light received by the CMOS imager 14. In one embodiment the protective layer 102 is a metal layer which can also be used as an interconnect layer for electrically connecting other circuits on the substrate 110. In another embodiment the protective layer 102 is an opaque layer formed during the fabrication process of the integrated circuit 100. Integrating a CMOS imager 14, non-volatile memory 34 and support circuitry for decoding and processing optical information received by the CMOS imager 14 allows for a single chip 3 image sensing device, such as a digital camera 5.

Although specific embodiments have been illustrated and described herein, it will be appreciated by those skilled in the art that any arrangement which is calculated to achieve the same purpose may be substituted for the specific embodiment of the present invention. This application is intended to cover any adaptations or variations of the present invention.

What is claimed is:

1. An apparatus comprising:
    an array of active pixels disposed on a silicon substrate, each active pixel of the array comprising a respective photodiode, the array to provide signals associated with an image to be focused on the array;
    a controller disposed on the substrate and coupled to the array to provide correlated double sampling of signals associated with the image;
    an analog-to-digital converter disposed on the substrate and coupled to the array to convert analog signals associated with the image into digital signals associated with the image;
    a digital signal processor disposed on the substrate and coupled to the analog-to-digital converter to perform signal processing on digital signals associated with the image;
    non-volatile memory disposed on the substrate having program code stored therein to control the processor;
    a control input to receive a signal to select one of at least two speeds at which signals associated with a frame of the image are to be provided from the digital signal processor; and
    a layer of material disposed proximate to the controller, the analog-to-digital converter, the processor, and the non-volatile memory, wherein the layer of material is at least partially absent proximate to the array to pass light to the array and to block light from regions outside the array.

2. The apparatus of claim 1, wherein the apparatus includes a digital-to-analog converter disposed on the substrate and coupled to the analog-to-digital converter.

3. The apparatus of claim 1, further comprising non-volatile memory having stored therein image field sensitivity information associated with the array of active pixels.

4. The apparatus of claim 3, further comprising non-volatile memory having identification information stored therein.

5. The apparatus of claim 4, wherein the identification information comprises information concerning a camera into which the apparatus is incorporated.

6. The apparatus of claim 1, further comprising non-volatile memory having identification information stored therein.

7. The apparatus of claim 6, wherein the identification information comprises information concerning a camera into which the apparatus is incorporated.

8. The apparatus of claim 1, wherein the control input is to receive the signal to select one of at least three speeds at which signals associated with the frame of the image are to be provided from the digital signal processor.

9. The apparatus of claim 8, further comprising non-volatile memory having identification information stored therein.

10. The apparatus of claim 9, wherein the identification information comprises information concerning a camera into which the apparatus is incorporated.

11. The apparatus of claim 10, wherein the apparatus includes a digital-to-analog converter disposed on the substrate and coupled to the analog-to-digital converter.

* * * * *